United States Patent
Biehlmann et al.

(10) Patent No.: US 11,442,678 B2
(45) Date of Patent: Sep. 13, 2022

(54) METHOD AND SYSTEM FOR PRINTING A MULTI-MEDIA DOCUMENT FROM AN IMAGE FILE

(71) Applicant: Entrust Datacard Corporation, Shakopee, MN (US)

(72) Inventors: Christophe Biehlmann, Shakopee, MN (US); Vishal Arora, Shakopee, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 544 days.

(21) Appl. No.: 15/941,960

(22) Filed: Mar. 30, 2018

(65) Prior Publication Data
US 2018/0285045 A1 Oct. 4, 2018

Related U.S. Application Data

(60) Provisional application No. 62/479,601, filed on Mar. 31, 2017.

(51) Int. Cl.
*G06F 3/12* (2006.01)

(52) U.S. Cl.
CPC .......... *G06F 3/1298* (2013.01); *G06F 3/1204* (2013.01); *G06F 3/1206* (2013.01); *G06F 3/1247* (2013.01); *G06F 3/1285* (2013.01); *G06F 3/1255* (2013.01)

(58) Field of Classification Search
CPC ............................. G06F 3/1206; G06F 3/1204
See application file for complete search history.

(56) References Cited

U.S. PATENT DOCUMENTS

| | | | |
|---|---|---|---|
| 6,894,710 B2 | 5/2005 | Suzuki et al. | |
| 7,194,618 B1* | 3/2007 | Suominen | H04L 63/123 |
| | | | 713/168 |
| 7,398,972 B2 | 7/2008 | Schuller et al. | |
| 7,744,001 B2* | 6/2010 | LaBrec | G06K 19/08 |
| | | | 235/487 |
| 2003/0090712 A1 | 5/2003 | Lenz et al. | |

(Continued)

FOREIGN PATENT DOCUMENTS

WO 2015042060 A1 3/2015

OTHER PUBLICATIONS

International Search Report and Written Opinion issued in PCT/US2018/025484 dated Jul. 20, 2018, 15 pages.

(Continued)

*Primary Examiner* — Benjamin O Dulaney
(74) *Attorney, Agent, or Firm* — Hamre, Schumann, Mueller & Larson, P.C.

(57) ABSTRACT

System and methods for printing a multi-media document from an image file are provided. The method includes a printing device receiving a data holding image file. A processor of the printing device parses and extracts document data for printing the multi-media document from the data holding image file. The processor processes the document data to receive instruction data for one or more printing operation components of the printing device. The method also includes sending the instruction data to one or more printer operation components of the printing device. Also, the method includes each of the one or more printer operation components performing a printer operation onto a multi-media document.

19 Claims, 2 Drawing Sheets

(56) References Cited

U.S. PATENT DOCUMENTS

| | | |
|---|---|---|
| 2005/0196021 A1 | 9/2005 | Seto et al. |
| 2007/0139741 A1* | 6/2007 | Takami ............... H04N 1/00482 358/538 |
| 2007/0216934 A1* | 9/2007 | Yamada ................ G06F 21/608 358/1.15 |
| 2007/0291296 A1* | 12/2007 | Fukuda ................ G06F 3/1285 358/1.14 |
| 2009/0315318 A1 | 12/2009 | Jones et al. |
| 2010/0128296 A1* | 5/2010 | Denniston, Jr. .... G06V 30/1423 358/1.13 |
| 2013/0220984 A1 | 8/2013 | Cronin et al. |
| 2014/0084071 A1* | 3/2014 | Einman ................ G06K 1/121 235/492 |
| 2014/0345787 A1 | 11/2014 | Zaborowski et al. |
| 2015/0078671 A1 | 3/2015 | van Deventer et al. |
| 2016/0078247 A1* | 3/2016 | Tucker ................. G06F 21/602 726/1 |
| 2016/0269588 A1* | 9/2016 | Nakano ................ G06K 15/021 |
| 2016/0300128 A1 | 10/2016 | Alvig et al. |

OTHER PUBLICATIONS

PNG(Portable Network Graphics) Specification, Glenn et al., retrieved at http://www.libpng.org/pub/png/spec/1.2/png-1.2-pdg.html, Jul. 1999, 85 pages.

CIPA DC- 008—Translation—2012, prepared by Standardization Committee, Published by Camera & Imaging Products Association, retrieved at http://www.cipa.jp/std/documents/e/DC-008-2012_E.pdf, Established Apr. 2010, Revised Dec. 2012, 190 pages, (split into two parts due to size: NPL3_part1 and NPL3_part2).

Extended European Search Report, European Patent Application No. 18775169.8, dated Nov. 20, 2020 (7 pages).

* cited by examiner

Fig. 1

METHOD AND SYSTEM FOR PRINTING A MULTI-MEDIA DOCUMENT FROM AN IMAGE FILE

FIELD

This disclosure relates to a method and system for printing a multi-media document from an image file.

BACKGROUND

As printing devices become increasing more reliant on interconnectivity with customers, other printing devices, and servers, accurate and secure printing of a multi-media document is desired. In many instances, a printing application may be required to receive and/or store multiple types of data in order to manage multiple different printing operations performed on a multi-media document. This can introduce complexity to the printing process.

SUMMARY

This application is directed to a method and system for printing a multi-media document from an image file.

In particular, the embodiments described herein can issue and/or personalize a multi-media document using data stored in a standard image file. In some embodiments, issuance and/or personalization of the multi-media document can be completed without prior knowledge of the printing device, the capabilities of the printing device, the type of document that is printed upon, or the protocol used by the printing device.

In some embodiments, data for performing one or more printing operations on a multi-media document are stored as metadata in a single image file. Also, in some embodiments, one or more printing operations on a multi-media document can be performed using only data stored in the single image file. Accordingly, one or more printing operations can be performed on a multi-media document using data received in a single payload (e.g., the image file).

The embodiments described herein allows a printing device to perform one or more printing operations onto a multi-media document based on personalization data, instruction data, and security data stored within a single payload (e.g., an image file). This can help prevent tampering of the printing device as it is no longer necessary to transmit multiple payloads of data over a network for providing personalization data, instruction data and security data to a printing device. Also, the data integrity can be increased because all of the necessary data for performing one or more printing operations on a multi-media document is provided in a single payload (e.g., an image file). These embodiments can also reduce the amount of network bandwidth that is used as it is no longer necessary to transmit multiple payloads of data over a network to the printing device.

In some embodiments, a printing device can be a smart device (e.g., smart phone, tablet, personal computer, etc.) that receives a data holding image file and has an application that can handle and/or render a multi-media document in the application. That is, the smart device can render an image of the multi-media document for display on the smart device as the multi-media document would appear when physically printed. The rendered multi-media document can include some or all of the document data that would be included in a physically printed multi-media document, can have the appearance of a physically printed multi-media document (e.g., same background image, account information, embossed letters, etc.), and can be used the same (e.g., to conduct a transaction) as a physically printed multi-media document. In some embodiments, the rendered multi-media document can be used to meet a financial institution's mobile banking and/or wallet application requirements.

In some embodiments, the data holding imaging file can be sent to a first printing device (e.g., a central issuance system or a desktop card printer) and a second printing device (e.g., a smart device).

In one embodiment, a method for printing a multi-media document using a printing device is provided. The method includes a printing device receiving a data holding image file. Also, the method includes printing the multi-media document using document data extracted from the data holding image file.

In another embodiment, a method for preparing a data holding image file for use in printing a multi-media document using a printing device is provided. The method includes receiving document data for performing one or more printing operations onto the multi-media document. The method also includes receiving an image file. Further, the method includes storing the processed document data into the image file to form a data holding image file. Moreover, the method includes sending the data holding image file to the printing device. In some embodiments, the method can further include processing of document data for storage into the image file.

In yet another embodiment, a printing device is provided. The printing device includes a network input/output, and a plurality of printer operation components. The network input/output receives a data holding image file. One or more of the printer operation components performs a printing operation onto the multi-media document using document data extracted from the data holding image file.

In another embodiment, a multi-media document issuance system is provided. The system includes a printing device. The printing device includes a network input/output, and a plurality of printer operation components. The network input/output receives a data holding image file via a network. One or more of the printer operation components performs a printing operation onto a multi-media document based on document data extracted from the data holding image file.

Also, in another embodiment a method for printing a multi-media document using a printing device is provided. The method includes the printing device receiving a first data holding image file having first personalization data. Also, the method includes the printing device receiving a second data holding image file having second personalization data. The first personalization data is different from the second personalization data.

DETAILED DESCRIPTION

This application is directed to a method and system for printing a multi-media document from an image file.

In particular, the embodiments described herein can issue a multi-media document using data stored in a standard format image file. Issuance of the multi-media document can be completed without prior knowledge of the printing device, the capabilities of the printing device, the type of document that is printed upon, or the protocol used by the printing device.

Examples of protocols that can be used by the printing device include, for example, an Internet printing protocol (IPP), a print command language (PCL) protocol, etc.

In some embodiments, data for performing one or more printing operations on a multi-media document are stored as metadata in a single image file. Also, in some embodiments, one or more printing operations on a multi-media document can be performed using only data stored in the single image file. Accordingly, one or more printing operations can be performed on a multi-media document using data received in a single payload (e.g., the image file).

The embodiments described herein allows a printing device to perform one or more printing operations onto a multi-media document based on personalization data, instruction data, and security data stored within a single payload (e.g., an image file). This can help prevent tampering of the printing device as it is no longer necessary to transmit multiple payloads of data over a network for providing personalization data, instruction data and security to a printing device. Also, the data integrity can be increased because all of the necessary data for performing one or more printing operations on a multi-media document is provided in a single payload (e.g., an image file). These embodiments can also reduce the amount of network bandwidth that is used as it is no longer necessary to transmit multiple payloads of data over a network to the printing device.

A multi-media document, as defined herein, includes a document (e.g., plastic card, booklet, etc.) having two or more printing operations printed or applied thereon as well as a rendered multi-media document such as a digital rendering of a card that can be displayed by a smart phone or tablet. Examples of printing operations can include, for example, image printing (e.g., ultra violet printing (UV printing), etc.), magnetic stripe writing (e.g., magstripe encoding, etc.), text embossing, smart card chip writing and/or programming, laminating, laser engraving, laser marking, etc. Examples of a multi-media document include, for example, a financial card (e.g., credit card, debit card, etc.), an identification card, a driver's license, a passport, etc. It will be appreciated that different printing operations are performed based on the type of document being printed on. For example, a gift card may include magnetic stripe information when the card to be printed on includes a magnetic stripe.

A standard image file as described herein refers to a digital image file organized and stored in a standardized file format that supports the storage of metadata (e.g., a PNG file format, a TIFF file format, a JPEG file format, etc.). The format, content, order, etc. of the metadata can be defined by a metadata standard to provide information for a processor to decode and render the image as well as provide other information including a date and location of where the image was taken. Examples of metadata standards that can be used to store metadata in a standard image file can include, for example, EXIF for a JPEG (Joint Photographic Experts Group) file format and a TIFF (Tag Image File Format) file format, Chunk Specification for a PNG (Portable Network Graphics) file format, etc.

The printing device can be used, for example, to personalize plastic cards such as financial cards including credit and debit cards, identification cards, driver's licenses, and other personalized plastic cards. In some embodiments, the printing device is a card printer.

The types of printing devices and subcomponents of a printing device (hereinafter referred to simply as the printing device) can include, for example, a central card issuance system, a desktop card printer, a desktop embosser, a passport system, a desktop laminator, a smart card reader, an input and/or output card hopper, etc. In some embodiments, the printing device can be a smart device (e.g., smart phone, tablet, personal computer, etc.) that receives the data holding image file and has an application that can handle and/or render a multi-media document in the application. That is, the smart device can render an image of the multi-media document for display on the smart device as the multi-media document would appear when physically printed. The rendered multi-media document can include some or all of the document data that would be included in a physically printed multi-media document, can have the appearance of a physically printed multi-media document (e.g., same background image, account information, embossed letters, etc.), and can be used the same (e.g., to conduct a transaction) as a physically printed multi-media document. In some embodiments, the rendered multi-media document can be used to meet a financial institution's mobile banking and/or wallet application requirements.

Details of a desktop card printer are described in U.S. Publication No. 2016/0300128 which is incorporated by reference in its entirety. An example of retransfer printing is described in U.S. Pat. No. 6,894,710 the entire contents of which are incorporated herein by reference. Examples of suitable card reorienting mechanisms are described in U.S. 2013/0220984 and U.S. Pat. No. 7,398,972 each of which is incorporated herein by reference in its entirety. An example of a suitable de-bowing mechanism that can be used is described in U.S. 2014/0345787 the entire contents of which are incorporated herein by reference.

Figure 1:
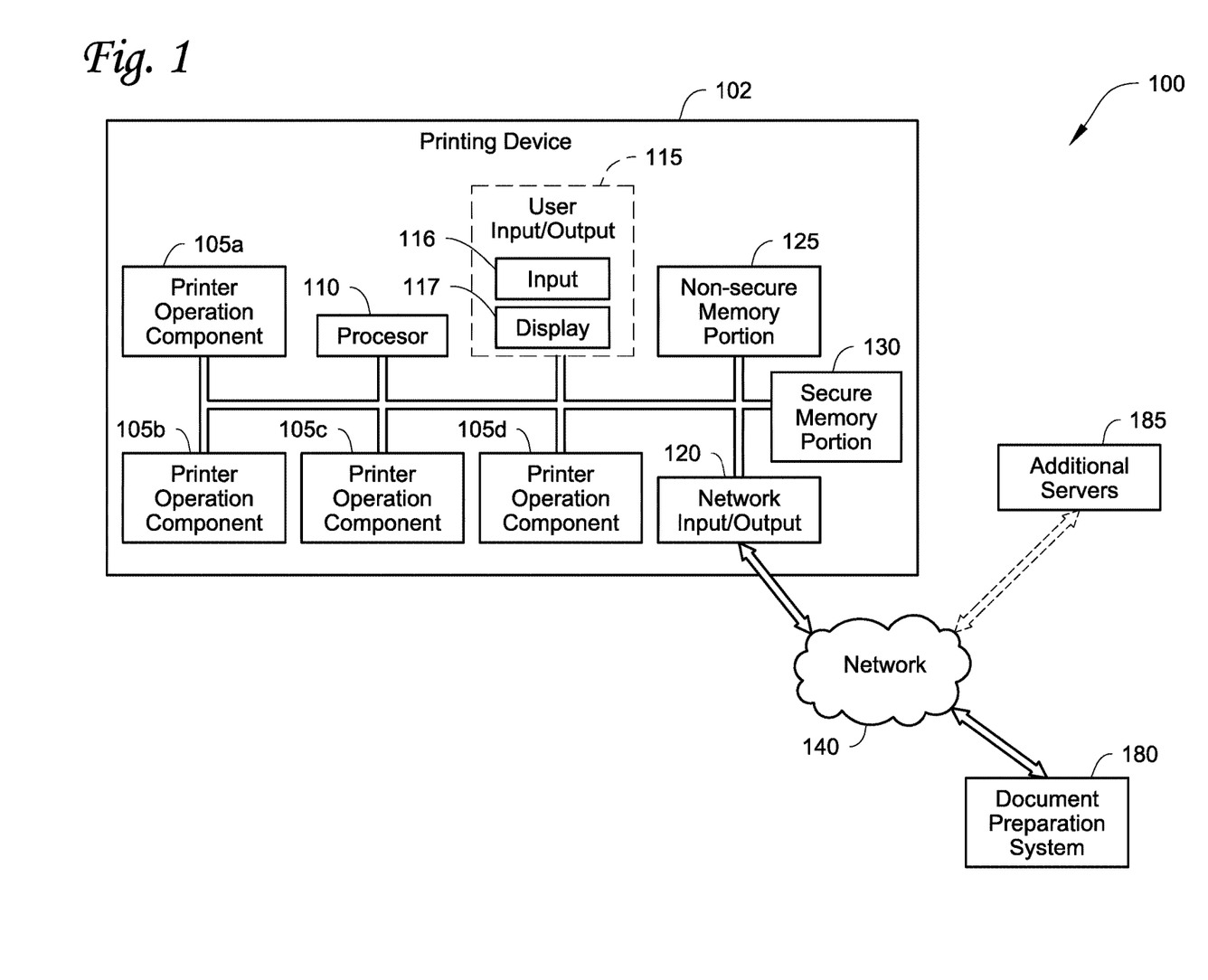
FIG. 1 illustrates a schematic diagram of an exemplary architecture for a multi-media document issuance system for issuing one or more multi-media documents, according to one embodiment.

FIG. 1 illustrates a schematic diagram of an exemplary architecture for a multi-media document issuance system 100 for issuing one or more multi-media documents. The system 100 includes a printing device 102 and a document preparation system 180 that can be used in the embodiments described herein. The printing device 102 generally includes a plurality of printer operation components 105, a processor 110, an optional user input/output (I/O) 115, a network I/O 120, a non-secure memory portion 125, a secure memory portion 130, and an interconnect 150. The printing device 102 is in communication with the document preparation system 180 and optionally one or more additional servers 185 through a network 140.

The printing device 102 is generally representative of hardware aspects of a variety of printing devices and subcomponents that can be used in the issuance of a multi-media document. Examples of the printing device 102 can include a central card issuance system, a desktop card printer, a desktop embosser, a passport system, a desktop laminator, a smart card reader, an input and/or output card hopper, etc. It will be appreciated that the examples of the printing device 102 listed above are exemplary and other types of printing devices can also be included. In some embodiments, the printing device can be a smart device (e.g., smart phone, tablet, personal computer, etc.) that receives the data holding image file and has an application that can handle and/or render a multi-media document in the application. That is, the smart device can render an image of the multi-media document for display on the smart device as the multi-media document would appear when physically printed. The rendered multi-media document can include some or all of the document data that would be included in a physically printed multi-media document, can have the appearance of a physically printed multi-media document (e.g., same background image, account information, embossed letters, etc.), and can be used the same (e.g., to conduct a transaction) as a physically printed multi-media document. In some embodiments, the rendered multi-media document can be used to meet a financial institution's mobile banking and/or wallet application requirements.

Each of the plurality of printer operation components 105 can perform one or more printing operations of the printing device 102 such as, for example, image printing (e.g., ultra violet printing (UV printing), etc.), magnetic stripe writing (e.g., magstripe encoding, etc.), text embossing, smart card chip writing and/or programming, laminating, laser engraving, laser marking, etc. For example, when the printing device 102 is a central issuance printer, a first printer operation component 105*a* can print an image onto the multi-media document, a second printer operation component 105*b* can encode data onto a magstripe of the multi-media document, a third printer operation component 105*c* can emboss text onto the multi-media document, and a fourth printer operation component 105*d* can write onto a smart card chip of the multi-media document.

The processor 110 controls operation of the printing device 102 including the plurality of printer operation components 105, the network I/O 120 and the optional user I/O 115. The processor 110 can retrieve and execute programming data received by the network I/O 120 and/or the optional user I/O 115 and stored in the non-secure memory portion 125. The processor 110 can also store, identify and use application data residing in the non-secure memory portion 125. In some embodiments, the processor 110 can control the plurality of printer operation components 105 based on document data extracted from a data holding image file received, for example, via the network I/O 120 and/or the optional user I/O 115.

The interconnect 150 is used to transmit programming instructions and/or application data between the processor 110, the plurality of printer operation components 105, the optional user I/O 115, the network I/O 120, the non-secure memory portion 125, and the secure memory portion 130. The interconnect 150 can, for example, be one or more busses or the like. The processor 110 can be a single processor, multiple processors, or a single processor having multiple processing cores.

The optional user I/O 115 can include a display 116 and/or an input 117, according to some embodiments. It is to be appreciated that the optional user I/O 115 can be one or more devices connected in communication with the printing device 102 that is physically separate from the printing device 102. For example, the display 116 and the input 117 can be connected in communication but be physically separate from the printing device 102. In some embodiments, the display 116 and input 117 can be physically included with the printing device 102.

The display 116 can include any of a variety of display devices suitable for displaying information to the user. Examples of devices suitable for the display 116 include, but are not limited to, a cathode ray tube (CRT) monitor, a liquid crystal display (LCD) monitor, a light emitting diode (LED) monitor, or the like.

The input 117 can include any of a variety of input devices or means suitable for receiving an input from the user. Examples of devices suitable for the input 117 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 117 can be included as the input 117. In some embodiments, the input 117 can be integrated with the display 116 such that both input and output are performed by the display 116.

The network I/O 120 is configured to transmit and receive data to the document preparation system 180 and optionally the one or more servers 185 via the network 140. The network 140 may alternatively be referred to as the communications network 140. In particular, the network I/O 120 can receive a data holding image file from the document preparation system 180 that can be provided to the processor 110 for printing a multi-media document. Examples of the network 140 can include, but are not limited to, a local area network (LAN), a wide area network (WAN), the Internet, a wired communication link, or the like. In some embodiments, the network I/O 120 can transmit and receive data via the network 140 through a wireless connection using Wi-Fi, Bluetooth, ZigBee or other similar wireless communication protocols. In some embodiments, the printing device 102 can transmit data via the network 140 through a cellular, 3G, 4G, or other wireless protocol. In some embodiments, the network I/O 120 can transmit and receive data via a wire line, an optical fiber cable, a Universal Serial Bus "USB" cable, or the like. It is to be appreciated that the network I/O 120 can communicate through the network 140 through suitable combinations of the preceding wired and wireless communication methods.

In some embodiments, the network I/O 120 can transmit an image of the multi-media document to be printed and an approval request to a smart device (e.g., smart phone, tablet, personal computer, etc.) (not shown). The smart device can then transmit an approval instruction back to the printing device 102 via the network I/O 120 to allow the printing device 102 to move forward with printing the multi-media document.

The non-secure memory portion 125 is generally included to be representative of a random access memory such as, but not limited to, Static Random Access Memory (SRAM), Dynamic Random Access Memory (DRAM), or Flash. In some embodiments, the non-secure memory portion 125 can be a volatile memory. In some embodiments, the non-secure memory portion 125 can be a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, at least a portion of the memory can be virtual memory.

The non-secure memory portion 125 can store an application or firmware that can be used by the processor 110 to be able to perform two or more printing operations onto a multi-media document based on document data stored in an image file.

The secure memory portion 130 is generally included to be representative of a memory storage device that is distinct and/or separate from the non-secure memory portion 125. In some embodiments, the secure memory portion 130 can include a processor. Also, in some embodiments, the secure memory portion 130 can include, for example, a secure crypto processor such as a TPM, a JAVA card, a memory device, etc. Suitable TPMs are sold by Infineon Technologies AG (Munich, Germany). In some embodiments, the secure memory portion 130 can include the capabilities for secure generation of cryptographic keys. In some embodiments, private keys used in the secure memory device may not be accessible on a bus or to external programs and all encryption/decryption may be done within the secure memory portion 130. In some embodiments, the secure memory portion 130 can be part of but isolated from other components of the non-secure memory portion 125.

The document preparation system 180 can be configured to generate a data holding image file. The document preparation system 180 can also be configured to send the data holding image file to the printing device 102 for printing a multi-media document. The document preparation system 180 can be part of, for example, a document personalization server or a financial instant issuance server. In some embodiments, the document preparation 180 system can include, or be adapted to run, software for printing an image such as TruCredential™ or CardWizard® software available from Entrust Datacard Corporation (Shakopee, Minn.). In some embodiments, the document preparation system 180 can be a cloud-computing infrastructure that allows the data holding image file to be generated in the cloud. In some embodiments, the document preparation system 180 can be located at a single physical location such that the data holding image file is generated at an on-site premise.

The document preparation system 180 can be configured to combine all relevant data to be sent to the printing device 102 for allowing the printing device 102 to print a multi-media document. The document preparation system 180 can be configured to store the relevant data as metadata into an image file.

The one or more servers 185 can include, for example, a document personalization server or a financial instant issuance server. In some embodiments, the document preparation system 180 can communicate back and forth with the one or more servers 185 in order, for example, for the document preparation system 180 to receive all relevant data to be sent to the printing device 102.

Figure 2:
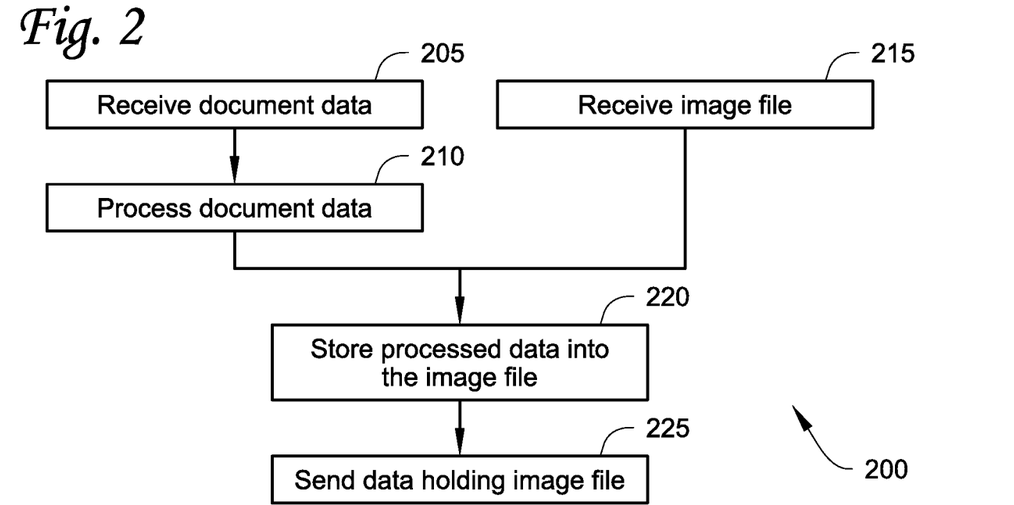
FIG. 2 illustrates a flowchart of a method for preparing a data holding image file that can be used for printing a multi-media document using the multi-media document issuance system shown in FIG. 1, according to one embodiment.

FIG. 2 illustrates a flowchart of one embodiment of a method 200 for preparing a data holding image file that can be used for printing a multi-media document using the multi-media document issuance system 100 shown in FIG. 1. It will be appreciated that in some embodiments the method 200 can be performed in a cloud-computing infrastructure that allows the data holding image file to be generated in the cloud. In other embodiments, the method 200 can be performed at an on-site premise.

At 205, the document preparation system 180 receives document data to be used for printing a multi-media document. The document data can include, for example, personalization data, instruction data, security data, etc. The personalization data can include personal data unique for the multi-media document to be printed. This can include, for example, account number information (e.g., account number, Card Verification Value (CVV) number, etc.), personal information (e.g., name, address, phone number, social security number, etc.), an expiration date of the multi-media document, etc.

The instruction data can include command data for instructing the printing device 102 as to the particular printing operations to be performed by the printing device 102 onto the multi-media document. That is, the command data provides direction to the document preparation system 180 as to which data of the document data is associated with and to be used for performing a particular printing operation so that the printing device 102 can determine what to do with all of the document data. The instruction data can include information as to whether a particular printing operation to be performed on the multi-media document is required or optional. Also, the instruction data can include an instruction to retrieve static data already stored in the non-secure memory portion 125. For example, the instruction data can include an instruction for the printing device 102 to retrieve a background image stored in the non-secure memory portion 125 to be printed onto the multi-media document.

The security data can include, for example, a key reference and/or a key (e.g., a public key, a private key, etc.) that can be used, for example, for establishing authorization of a printing device to read the prepared data holding image file for use in printing the multi-media document. The method 200 then proceeds to 210.

At 210, the document preparation system 180 processes the document data into processed data for storage into an image file. In some embodiments, processing the document data can include processing the document data so as to be capable of storage as metadata within an image file. In some embodiments, processing the document data can include digitally signing the document data. In some embodiments, processing the document data can also include encrypting the document data such that only an authorized printing device can decrypt the document data in order to print the multi-media document. For example, encrypting the document data can include using a public key infrastructure (PKI). It will be appreciated that the document preparation system 180 can process the document data irrespective of what type of printing device could be used to for printing the multi-media document and/or without any knowledge of the printer operation components available to the printing device.

At 215, the document preparation system 180 receives an image file to be sent to the printing device 102. In some embodiments, the image file includes image data to be printed onto a multi-media document. The image file can be organized and stored in, for example, a PNG file format, a TIFF file format, a JPEG file format, or any other format the supports the storage of metadata. In some embodiments, the image file may, when received, be preloaded with document data (e.g., a color profile) that can be used by the printing device 102 to, for example, enhance a printing operation of the image data onto a multi-media document. Also in some embodiments, the preloaded document data may be used by one or more printer operation components but ignored by other printer operation component(s).

When the document preparation system 180 processes the document data into the processed data (210) and receives the image file (215), the method 200 proceeds to 220. In some embodiments, the document preparation system 180 can receive (205) and process (210) document data while simultaneously receiving an image file (215). In other embodiments, the document preparation system 180 can receive (205) and/or process (210) document data before receiving an image file (215). In yet some other embodiments, the document preparation system 180 can receive (205) and process (210) document data after receiving an image file (215).

At 220, the document preparation system 180 stores the document data as metadata into the image file to form a data holding image file. The method 200 then proceeds to 225. At 225, the document preparation system 180 sends the data holding image file to the printing device 102 via, for example, the network 140. It will be appreciated that the data holding image file is prepared and sent by the document preparation system 180 regardless of what type of printing device is used and/or without any knowledge of the printer operation components available to the printing device. Printing a multi-media document using the data holding image file is described below with respect to FIG. 3.

Figure 3:
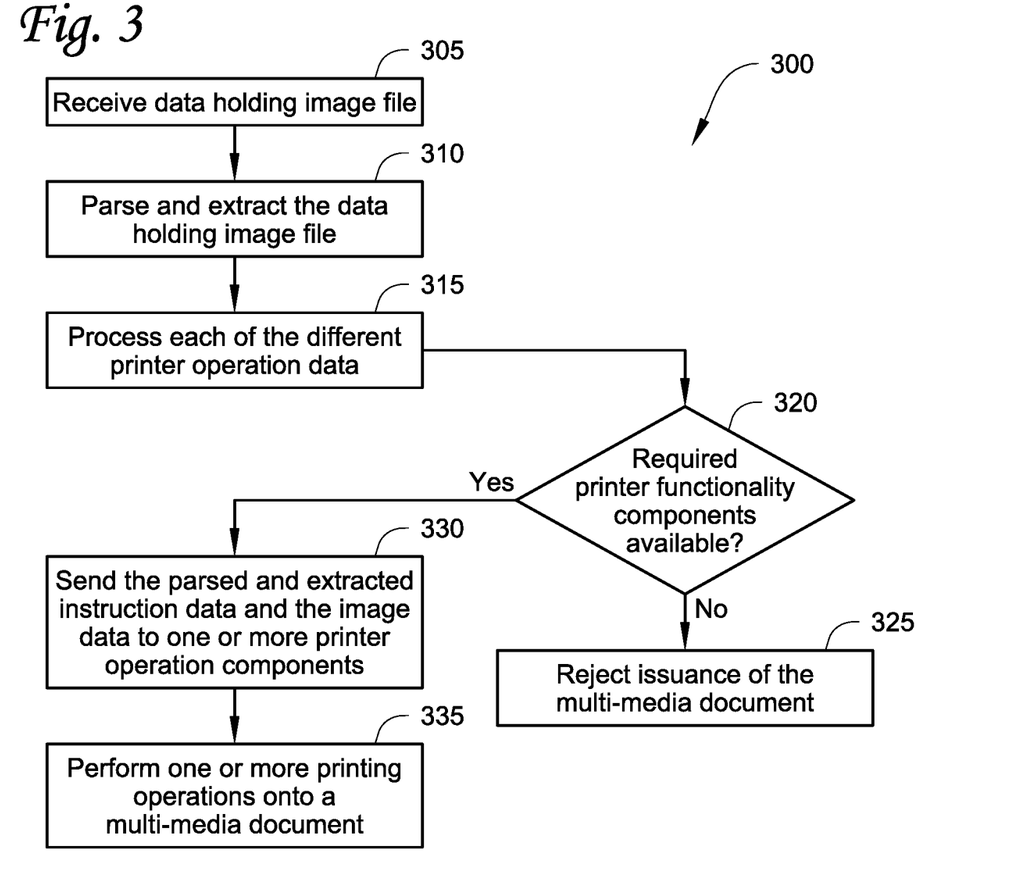
FIG. 3 illustrates a flowchart of a method for printing a multi-media document from an image file using the multi-media document issuance system shown in FIG. 1, according to one embodiment.

FIG. 3 illustrates a flowchart of one embodiment of a method 300 for printing a multi-media document from an image file using the multi-media document issuance system 100 shown in FIG. 1. At 305, the printing device 102 receives a data holding image file via, for example, the network I/O 120 or the optional user I/O 115. In some embodiments, the printing device 102 can be a smart device (e.g., smart phone, tablet, personal computer, etc.) that has an application that can receive the data holding image file. The method 300 then proceeds to 310.

At 310, the processor 110 then parses and extracts one or more of the personalization data, the instruction data, and the security data from the processed data stored in the data holding image file and image data from the data holding image file. Parsing the instruction data can include extracting different printer operation instruction data for a plurality of printing operations to be performed on the multi-media document. For example, the processor 110 can extract out image printing instruction data, magnetic stripe writing instruction data, text embossing instruction data, smart card chip writing and/or programming instruction data, laminating instruction data, laser engraving data, laser marking data, etc. In some embodiments, parsing and extracting the security data can include using a key reference and/or a key stored as part of the security data to authenticate whether the printing device 102 is authorized to access the document data to print a multi-media document. The method 300 then proceeds to 315.

At 315, the processor 110 processes each of the different printer operation data. Processing the different printer operation data includes determining whether any of the one or more printing operations to be performed on the multi-media document is optional or required. For any of the printing operations determined to be optional, the printing device 102 can silently ignore the particular printer operation data without taking any further action on such printer operation data.

For any of the different printer operation data that requires a particular printing operation to be performed on the multi-media document, processing the different printer operation data also includes determining whether the requisite printer operation component(s) to perform the required printing operation(s) are part of and available for use by the printing device 102 (320). If the printing device 102 does not include the requisite printer operation component(s) or the requisite printer operation component(s) are currently unavailable to perform the required printing operation(s), the method 300 proceeds to 325. Otherwise, the method proceeds to 330.

At 325, the printing device 102 can reject issuance of the multi-media document and the method 300 ends. In some embodiments, this can include sending an alert to a customer or issuer that the multi-media document cannot be issued.

At 330, the processor 110 then sends the parsed instruction data and the image data to the relevant one or more printer operation components 105 via the interconnect 150. For example, in one embodiment, the processor 110 can send image printing instruction data and the image data to the first printer operation component 105a in order to print the image data onto a multi-media document; send magnetic stripe writing instruction data to the second printer operation component 105b in order to encode data onto a magstripe of the multi-media document; send text embossing instruction data to the third printer operation component 105c in order to emboss text onto the multi-media document; and send smart card chip writing and/or programming instruction data to the fourth printer operation component 105d in order to write onto a smart card chip of the multi-media document. In some embodiments, when the printing device 102 is a smart device (e.g., smart phone, tablet, personal computer, etc.) an application on the smart device can send the parsed instruction data and the image data to a displaying portion of the application. The method 300 then proceeds to 335.

At 335, each of the one or more printer operation components 105 performs a printing operation on a multi-media document based on the printer operation instruction data. For example, in one embodiment, the first printer operation component 105a prints the image data onto a multi-media document; the second printer operation component 105b encodes data onto a magstripe of the multi-media document; the third printer operation component 105c embosses text onto the multi-media document; and the fourth printer operation component 105d writes onto a smart card chip of the multi-media document.

In some embodiments, when the printing device 102 is a smart device (e.g., smart phone, tablet, personal computer, etc.), a displaying portion of an application on the smart device can handle and/or render a multi-media document in the application using the parsed instruction data and image data. That is, the smart device can render an image of the multi-media document for display on the smart device as the multi-media document would appear when physically printed. The rendered multi-media document can include some or all of the document data that would be included in a physically printed multi-media document, can have the appearance of a physically printed multi-media document (e.g., same background image, account information, embossed letters, etc.), and can be used the same (e.g., to conduct a transaction) as a physically printed multi-media document. In some embodiments, the rendered multi-media document can be used to meet a financial institution's mobile banking and/or wallet application requirements.

In some embodiments, prior to the one or more printer operation components performing a printing operation on the multi-media document, the network I/O 120 can transmit an image of the multi-media document to be printed and an approval request to a smart device (e.g., smart phone, tablet, personal computer, etc.). The smart device can then transmit an approval instruction back to the printing device 102 via the network I/O 120 to allow the one or more printer operation components 105 to move forward with printing the multi-media document.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter. Accordingly, multiple of the above systems and methods can be used together in a single system or method.

Aspects:

It will be appreciated that any one of aspects 1-13, 14-22, 23-35, 36-49 and 50-54 can be combined.

Aspect 1. A method for printing a multi-media document using a printing device, the method comprising:
  the printing device receiving a data holding image file;
  printing the multi-media document using document data extracted from the data holding image file.

Aspect 2. The method of aspect 1, wherein the data holding image file contains personalization data associated with an intended holder of the multi-media document.

Aspect 3. The method of aspect 2, wherein the personalization data includes one or more of: an account number, a Card Verification Value number, a name, an address, an expiration date of the multi-media document.

Aspect 4. The method of any one of aspects 1-3, further comprising:
  a processor of the printing device parsing and extracting the document data for printing the multi-media document;
  the processor processing the document data to receive instruction data for one or more printing operation components of the printing device; and
  sending the instruction data to one or more printer operation components of the printing device,
  wherein printing the multi-media document using data extracted from the data holding image file includes at least one of the one or more printer operation components performing a printer operation onto a multi-media document.

Aspect 5. The method of aspect 4, wherein parsing and extracting the processed data includes parsing one or more of personalization data, instruction data, and security data.

Aspect 6. The method of aspect 5, wherein parsing the instruction data includes extracting different printer operation instruction data for a plurality of printing operations to be performed on the multi-media document.

Aspect 7. The method of aspect 6, wherein the different printer operation instruction data includes two or more of: image printing instruction data, magnetic stripe writing instruction data, text embossing instruction data, smart card chip writing and/or programming instruction data, laminating instruction data, laser engraving data, and laser marking data.

Aspect 8. The method of any one of aspects 5-7, wherein parsing the security data includes authenticating whether the printing device is authorized to access the document data using a key reference stored as part of the security data.

Aspect 9. The method of any one of aspects 4-8, wherein processing the document data to receive the instruction data for one or more printing operation components of the printing device includes determining whether a printing operation of the plurality of printing operations to be performed on the multi-media document is required.

Aspect 10. The method of aspect 9, wherein when the printing operation is required, determining whether the printer operation component of the printing device is available for use by the printing device to perform the printing operation, and
  when the printer operation component is not available for use by the printing device to perform the printing operation, the printing device rejecting issuance of the multi-media document.

Aspect 11. The method of any one of aspects 9 and 10, wherein when the printing operation is not required, determining whether the printer operation component of the printing device is available for use by the printing device to perform the printing operation, and
  when the printer operation component is not available for use by the printing device to perform the printing operation, the printing device continuing to issue the multi-media document.

Aspect 12. The method of any one of aspects 1-11, wherein the printing device is one of a central card issuance system and a desktop card printer.

Aspect 13. The method of any one of aspects 1-12, wherein the printing device is a smart device, and
  wherein printing the multi-media document using the document data extracted from the data holding image file includes rendering an image of the multi-media document for display on the smart device as the multi-media document would appear when physically printed.

Aspect 14. A method for preparing a data holding image file for use in printing a multi-media document using a printing device, the method comprising:
  receiving document data for performing one or more printing operations onto the multi-media document;
  receiving an image file;
  storing the document data into the image file to form a data holding image file; and
  sending the data holding image file to the printing device.

Aspect 15. The method of claim 14, further comprising processing the document data for storage into the image file.

Aspect 16. The method of any one of aspects 14 and 15, wherein the document data includes one or more of personalization data, instruction data, and security data.

Aspect 17. The method of any one of aspects 14-16, wherein the data holding image file is stored in a standard image format.

Aspect 18. The method of aspect 17, wherein the standard image format includes one of a PNG file format, a TIFF file format, and a JPEG file format.

Aspect 19. The method of any one of aspects 14-18, further comprising digitally signing the processed document data in the data holding image file.

Aspect 20. The method of any one of aspects 14-19, further comprising encrypting the processed document data in the data holding image file.

Aspect 21. The method of any one of aspects 14-20, wherein the printing device is one of a central card issuance system and a desktop card printer.

Aspect 22. The method of any one of aspects 14-21, wherein the printing device is a smart device, and the method further comprising rendering an image of the multi-media document for display on the smart device as the multi-media document would appear when physically printed using the document data stored in the data holding image file.

Aspect 23. A printing device comprising:
a network input/output that receives a data holding image file; and
a plurality of printer operation components, wherein one or more of the printer operation components performs a printing operation onto the multi-media document using document data extracted from the data holding image file.

Aspect 24. The printing device of aspect 23, wherein the data holding image file contains personalization data associated with an intended holder of the multi-media document.

Aspect 25. The printing device of any one of aspects 23 and 24, wherein the personalization data includes one or more of: an account number, a Card Verification Value number, a name, an address, an expiration date of the multi-media document.

Aspect 26. The printing device of any one of aspects 23-25, wherein the data holding image file contains document data for performing a plurality of printing operations onto the multi-media document and the device further comprises:
a processor that parses and extracts the document data from the data holding image file, processes the document data to receive instruction data for one or more of a plurality of printing operation components, and sends the instruction data to the one or more of the plurality of printing operation components.

Aspect 27. The printing device of aspect 26, wherein the processor processes the document data to receive the instruction data, personalization data, and security data.

Aspect 28. The printing device of aspect 27, wherein the processor extracts different printer operation instruction data for a plurality of printing operations to be performed on the multi-media document.

Aspect 29. The printing device of aspect 28, wherein the different printer operation instruction data includes two or more of: image printing instruction data, magnetic stripe writing instruction data, text embossing instruction data, smart card chip writing and/or programming instruction data, laminating instruction data, laser engraving data, and laser marking data.

Aspect 30. The printing device of any one of aspects 27-29, wherein the processor authenticates whether the printing device is authorized to access the document data using a key reference stored as part of the security data.

Aspect 31. The printing device of any one of aspects 26-30, wherein the processor determines whether a printing operation of the plurality of printing operations to be performed on the multi-media document is required based on the instruction data.

Aspect 32. The printing device of aspect 31, wherein when the printing operation is required, the processor determines whether the printer operation component of the printing device is available for use by the printing device to perform the printing operation, and
when the printer operation component is not available for use by the printing device to perform the printing operation, the printing device rejects issuance of the multi-media document.

Aspect 33. The printing device of any one of aspects 31 and 32, wherein when the printing operation is not required, the processor determines whether the printer operation component of the printing device is available for use by the printing device to perform the printing operation, and
when the printer operation component is not available for use by the printing device to perform the printing operation, the printing device issues the multi-media document.

Aspect 34. The printing device of any one of aspects 23-33, wherein the printing device is one of a central card issuance system and a desktop card printer.

Aspect 35. The printing device of any one of aspects 23-34, wherein the printing device is a smart device, and
wherein the smart device renders an image of the multi-media document for display on the smart device as the multi-media document would appear when physically printed based on the document data extracted from the data holding image file.

Aspect 36. A multi-media document issuance system comprising:
a printing device including:
a network input/output that receives a data holding image file via a network, and
a plurality of printer operation components, wherein each of the printer operation components performs a printing operation onto a multi-media document based on document data extracted from the data holding image file.

Aspect 37. The system of aspect 36, wherein the data holding image file contains personalization data associated with an intended holder of the multi-media document.

Aspect 38. The system of aspect 37, wherein the personalization data includes one or more of: an account number, a Card Verification Value number, a name, an address.

Aspect 39. The system of any one of aspects 36-38, wherein the printing device further includes a processor that parses and extracts the document data from the data holding image file, processes the document data to receive instruction data for one or more of a plurality of printing operation components, and sends the instruction data to the one or more of the plurality of printing operation components.

Aspect 40. The system of aspect 39, further comprising a document preparation system that prepares the data holding image fie that stores document data for performing a plurality of printing operations onto the multi-media document, wherein the document preparation system sends the data holding image file to the printing device via the network.

Aspect 41. The system of any one of aspects 39 and 40, wherein the processor processes the document data to receive the instruction data, personalization data, and security data.

Aspect 42. The system of aspect 41, wherein the processor extracts different printer operation instruction data for a plurality of printing operations to be performed on the multi-media document.

Aspect 43. The system of aspect 42, wherein the different printer operation instruction data includes two or more of: image printing instruction data, magnetic stripe writing instruction data, text embossing instruction data, smart card chip writing and/or programming instruction data, laminating instruction data, laser engraving data, and laser marking data.

Aspect 44. The system of any one of aspects 41-43, wherein the processor authenticates whether the printing device is authorized to access the document data using a key reference stored as part of the security data.

Aspect 45. The system of any one of aspects 39-44, wherein the processor determines whether a printing operation of the plurality of printing operations to be performed on the multi-media document is required based on the instruction data.

Aspect 46. The system of aspect 45, wherein when the printing operation is required, the processor determines whether the printer operation component of the printing device is available for use by the printing device to perform the printing operation, and when the printer operation component is not available for use by the printing device to perform the printing operation, the printing device rejects issuance of the multi-media document.

Aspect 47. The system of any one of aspects 45 and 46, wherein when the printing operation is not required, the processor determines whether the printer operation component of the printing device is available for use by the printing device to perform the printing operation, and when the printer operation component is not available for use by the printing device to perform the printing operation, the printing device issues the multi-media document.

Aspect 48. The system of any one of aspects 36-47, wherein the printing device is one of a central card issuance system and a desktop card printer.

Aspect 49. The system of any one of aspects 36-48, wherein the printing device is a smart device, and wherein the smart device renders an image of the multi-media document for display on the smart device as the multi-media document would appear when physically printed based on the document data extracted from the data holding image file.

Aspect 50. A method for printing a multi-media document using a printing device, the method comprising:

the printing device receiving a first data holding image file having first personalization data; and the printing device receiving a second data holding image file having second personalization data, wherein the first personalization data is different from the second personalization data.

Aspect 51. The method of aspect 50, wherein the first personalization data is stored as metadata in the first data holding image file.

Aspect 52. The method of any one of aspects 50 and 51, wherein an image of the first data holding image file is the same as an image of the second data holding image file.

Aspect 53. The method of any one of aspects 50-52, wherein an image of the first data holding image file is different than an image of the second data holding image file.

Aspect 54. The method of any one of aspects 50-53, wherein the printing device is one of a central card issuance system and a desktop card printer.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method for printing a multi-media document using a printing device, the method comprising:
    the printing device receiving a data holding image file, the data holding image file including image data to be printed on the multi-media document and document data stored as metadata in the data holding image file;
    a processor of the printing device parsing and extracting the document data stored as the metadata from the data holding image file for printing the multi-media document;
    sending the image data to a first printer operation component of the printing device in order to print the image data onto the multi-media document;
    sending a portion of the document data to a second printer operation component of the printing device in order to perform a printing operation on the multi-media document;
    the first printer operation component performing a first printing operation of printing the image data on the multi-media document; and
    the second printer operation component performing a second printing operation on the multi-media document using the portion of the document data extracted from the data holding image file.

2. The method of claim 1, wherein the document data contains personalization data associated with an intended holder of the multi-media document.

3. The method of claim 1, further comprising:
    the processor processing the document data to receive instruction data for one or more printing operation components of the printing device; and
    sending the instruction data to one or more printer operation components of the printing device.

4. The method of claim 1, wherein parsing and extracting the processed data includes parsing one or more of personalization data, instruction data, and security data.

5. The method of claim 4, wherein parsing the instruction data includes extracting different printer operation instruction data for a plurality of printing operations to be performed on the multi-media document.

6. The method of claim 4, wherein parsing the security data includes authenticating whether the printing device is authorized to access the document data using a key reference stored as part of the security data.

7. The method of claim 1, wherein the printing device is one of a central card issuance system and a desktop card printer.

8. The method of claim 1, wherein the printing device is a smart device, and
    wherein printing the multi-media document using the document data extracted from the data holding image file includes rendering an image of the multi-media document for display on the smart device as the multi-media document would appear when physically printed.

9. A printing device comprising:
    a network input/output that receives a data holding image file including image data to be printed on a multi-media document and document data stored as metadata in the data holding image file; and
    a processor that parses and extracts the document data stored as the metadata from the data holding image file;

a plurality of printer operation components, wherein one or more of the printer operation components performs a printing operation onto the multi-media document using document data extracted from the data holding image file, wherein the processor sends the image data to a first printer operation component of the printing device in order to print the image data onto the multi-media document and sends a portion of the document data to a second printer operation component of the printing device in order to perform a printing operation on the multi-media document, and wherein a first printer operation component of the plurality of printer operation components performs a first printing operation of printing the image data on the multi-media document, and a second printer operation component performs a second printing operation on the multi-media document using the portion of the document data extracted from the data holding image file.

10. The printing device of claim 9, wherein the data holding image file contains personalization data associated with an intended holder of the multi-media document.

11. The printing device of claim 9,
wherein the processor processes the document data to receive instruction data for one or more of a plurality of printing operation components, and sends the instruction data to the one or more of the plurality of printing operation components.

12. The printing device of claim 11, wherein the processor processes the document data to receive the instruction data, personalization data, and security data.

13. The printing device of claim 12, wherein the processor extracts different printer operation instruction data for a plurality of printing operations to be performed on the multi-media document.

14. The printing device of claim 12, wherein the processor authenticates whether the printing device is authorized to access the document data using a key reference stored as part of the security data.

15. A method for preparing a data holding image file for use in printing a multi-media document using a printing device, the method comprising:

receiving document data for performing one or more printing operations onto the multi-media document;

receiving an image file to be printed on the multimedia document;

storing the document data as metadata into the image file to form a data holding image file;

digitally signing the document data in the data holding image file; and sending the data holding image file to the printing device.

16. The method of claim 15, further comprising processing the document data for storage into the image file as metadata.

17. The method of claim 15, wherein the data holding image file is stored in a standard image format.

18. The method of claim 15, wherein the printing device is one of a central card issuance system and a desktop card printer.

19. The method of claim 15, wherein the printing device is a smart device, and the method further comprising rendering an image of the multi-media document for display on the smart device as the multi-media document would appear when physically printed using the document data stored in the data holding image file.

* * * * *